(No Model.)

A. S. BUCKELEW.
BALANCE WHEEL FOR WATCHES.

No. 330,558. Patented Nov. 17, 1885.

WITNESSES:
Jos. N. Rosenbaum.
Ernst Wolff.

INVENTOR
Ansel S. Buckelew
BY
Goepel & Raegener
ATTORNEYS.

UNITED STATES PATENT OFFICE.

ANSEL S. BUCKELEW, OF JERSEY CITY, NEW JERSEY.

BALANCE-WHEEL FOR WATCHES.

SPECIFICATION forming part of Letters Patent No. 330,558, dated November 17, 1885.

Application filed January 7, 1885. Serial No. 152,184. (No model.)

*To all whom it may concern:*

Be it known that I, ANSEL S. BUCKELEW, of Jersey City, in the county of Hudson and State of New Jersey, have invented certain new and useful Improvements in Balance-Wheels for Watches and Chronometers, of which the following is a specification.

This invention has reference to an improved balance-wheel for watches and ships' chronometers, with an accurately-working compensating arrangement of cheap and simple construction; and the invention consists of a balance-wheel for watches and chronometers, the rim of which is made of two sections, which are supported by a diametrical bar attached to the arbor of the balance-wheel, while the opposite ends of the rim-sections are connected by an arc-shaped compensating-bar composed of two suitable metals. The compensating-bar is balanced either by a counter-weight attached to the diametrical bar, or by a second compensating-bar arranged symmetrically to the first bar.

Figure 1:
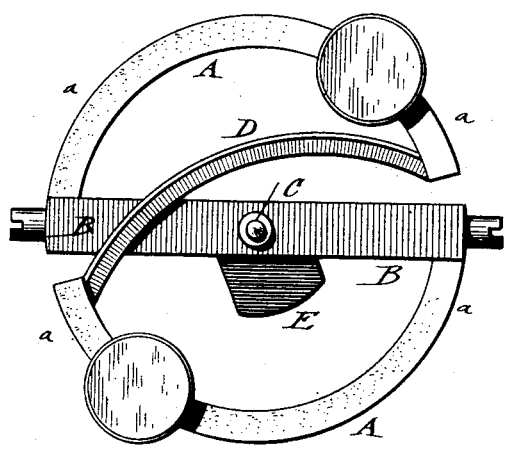
Figure 2:
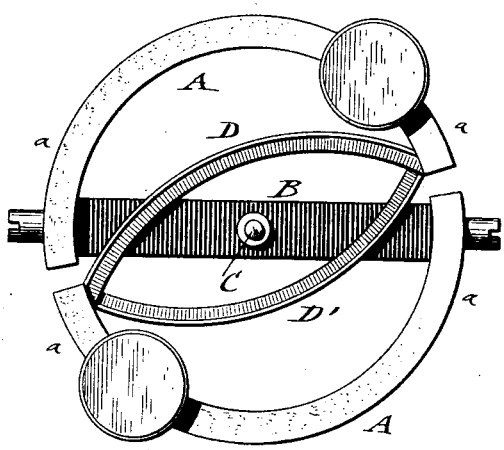

In the accompanying drawings, Figures 1 and 2 represent top views of my improved balance-wheel for watches and ships' chronometers.

Similar letters of reference indicate corresponding parts.

Referring to the drawings, A represents the circular rim of my balance-wheel for watches and ships' chronometers. The rim is made of two sections, $a$ $a$, of brass or other suitable metal, which sections are separated from each other at the ends by short interstices. Two of the ends of the rim-sections $a$ $a$ are connected by a diametrical supporting-bar, B, that is applied to the arbor C of the balance-wheel. The opposite ends of the rim-sections $a$ $a$ are connected by an arc-shaped compensating-bar, D, which is composed of two metals, the inner of which is of steel and the outer of brass. The rim-sections are provided in the customary manner with adjusting weights or screws, in the same manner as in the balance-wheels heretofore in use. For imparting to the balance-wheel the proper equilibrium, and for facilitating the adjustment, the curved compensating-bar D is balanced by a counter-weight, E, attached to the diametrical connecting-bar B, as shown in Fig. 1; or a second arc-shaped compensating-bar, D', symmetrical to the bar D, is used, as shown in Fig. 2.

My improved balance-wheel has the advantage that it can be manufactured at less expense than those heretofore in use, and that it is less susceptible to exterior influences, while compensating the changes of the temperature in a reliable manner.

Having thus described my invention, I claim as new and desire to secure by Letters Patent—

1. A balance-wheel for watches and chronometers, comprising two rim-sections, a supporting-bar extending between the rim-sections, and a compensating-bar extending between the rim-sections independent of the supporting-bar, substantially as described.

2. A balance-wheel for watches and chronometers, comprising two rim sections, a supporting-bar connecting the end of one rim-section with the opposite end of the other rim-section, and an arc-shaped compensating-bar, independent of the supporting-bar connecting the other ends of the rim-sections, substantially as described.

3. A balance-wheel for watches and chronometers, comprising two rim-sections, a supporting-bar connecting said rim-sections, an arc-shaped compensating-bar independent of the supporting-bar, also connecting the rim-sections, and a second arc-shaped compensating-bar symmetrical with the first, substantially as described.

In testimony that I claim the foregoing as my invention I have signed my name in presence of two subscribing witnesses.

ANSEL S. BUCKELEW.

Witnesses:
PAUL GOEPEL,
SIDNEY MANN.